Jan. 8, 1963

R. F. SNYDER 3,072,910

PRODUCTION RECORDER

Filed June 23, 1958

INVENTOR.
ROBERT F. SNYDER

BY

ATTORNEY

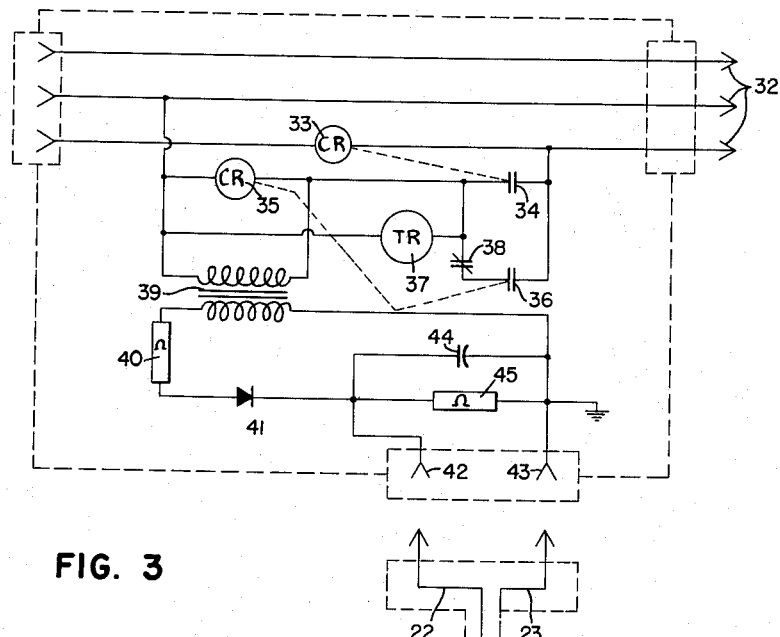

United States Patent Office 3,072,910
Patented Jan. 8, 1963

3,072,910
PRODUCTION RECORDER
Robert F. Snyder, Lakemore, Ohio, assignor to The Goodyear Tire & Rubber Company, Akron, Ohio, a corporation of Ohio
Filed June 23, 1958, Ser. No. 743,768
3 Claims. (Cl. 346—34)

This invention relates to apparatus for recording the production status of a plurality of machines, particularly electronic tabulators and the like, which may be operated under varying conditions of load and also for various periods of time.

Modern business activity requires greater and greater numbers of machines for performing repetitive operations. This is likely to become increasingly important as automation in the various industries expands. One of the areas in which the use of multiple machines for performing the same or allied functions is expanding at a rapid rate is that of high speed data processing. However, some very difficult problems have arisen with the use of large numbers of expensive and intricate machines for this purpose. Some of the more important problems involve the intelligent procurement and programming of machines in order to secure optimum machine use with minimum capital expenditure. Heretofore, it has been extremely difficult and tedious to ascertain the effective production time of each machine in order to secure data upon which a decision for the purchase of more machines or the rearrangement of machine use programming may be made. Moreover, the compilation of production time and use studies has been so difficult that the added costs threatened to offset any savings which might be made as a result of such investigations.

It is a primary object of the present invention to provide a production status recorder which is simple, accurate, and capable of accommodating a large scale operation utilizing a great number of machines.

It is a further object of the present invention to provide a recorder which requires a minimum capital expenditure per type of production unit involved.

It is a still further object of the present invention to provide a recorder which may be used with a large variety of machines.

These and other objects of the present invention will become apparent from the following description and drawings in which:

FIG. 3 is a wiring diagram of a sensing unit which is used to couple one type of machine to the recorder;

FIG. 4 is a wiring diagram of another type of sensing unit; and

As previously mentioned, the increasing use of large numbers of machines for performing multiple operations requires a simple and inexpensive device for recording the production status of each of the plurality of machines. While the present invention, which is designed to meet this need, may be utilized to record the production or down-time of a number of kinds of machines, it will be illustrated and described with particular reference to its use with high speed data processing equipment. It is typical in many large commercial installations that the number of data processors needed to maintain business records and the like may be a hundred or more. The recording of the production status of each of the machines is not economically feasible unless at most a few, preferably only one, recording devices may be used to create a composite record for all units. The present invention includes a specially designed multichannel chart recorder which can continuously monitor up to a hundred or more machines and record the production status of each during any desired increment of the working day, for example one minute. In order to provide great flexibility so that a variety of types of machines and operations may be accommodated, special sensing or coupling units are utilized to provide the recorder with the necessary signal representative of the operating condition of each unit. Such units also serve to isolate the delicate recorder mechanism from the large currents or voltages necessary to operate the machines. The strip chart recorder utilized may be in all respects similar to those commercially available, for example from Brown Instrument Company, except for the modifications illustrated in FIGS. 1 and 2 which will presently be described. It is believed that no description is necessary of a conventional strip chart recorder since such information is readily available.

Figure 2:
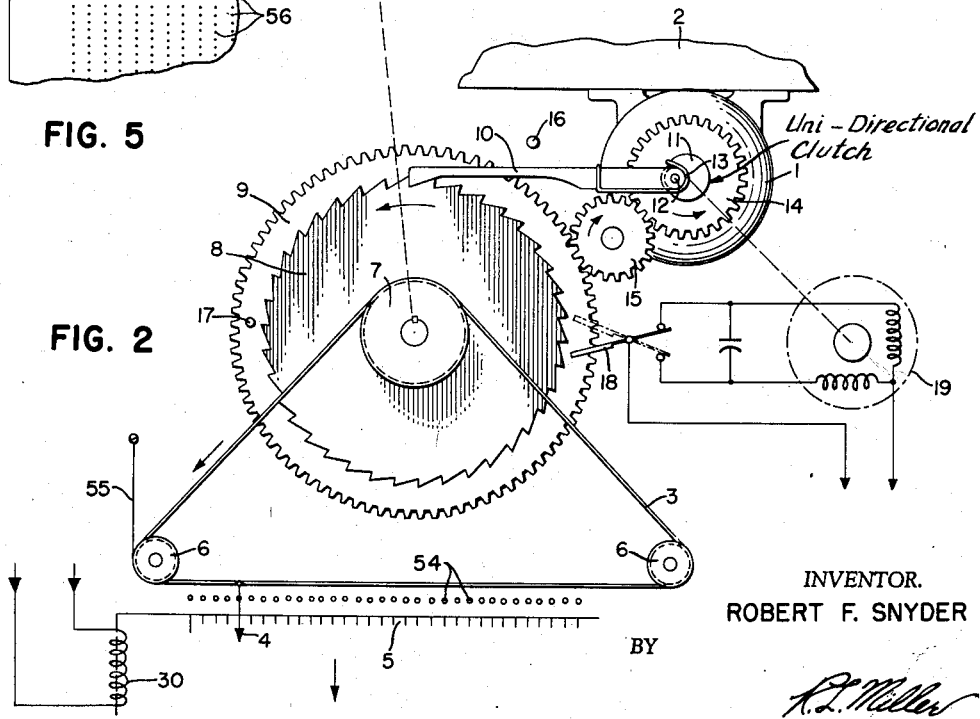
FIG. 2 illustrates certain novel mechanical features of the recorder.

Referring first to FIG. 2, a pen drive mechanism made according to the present invention and which is substituted for the drive mechanism found in a conventional strip chart recorder is illustrated. A drive motor 1, mounted by any suitable means on bracket 2, is mechanically connected through a series of gears and a rachet and pawl arrangement, which will be described later in detail, to a pen drive belt 3 on which is located recording pen 4. The pen 4 is traversed across a conventional strip chart 5 by the drive belt and gear arrangements previously mentioned. The chart 5 is advanced in a direction substantially perpendicular to the direction of pen traverse by means of a conventional motor and roll arrangement (not shown). The chart 5 is illustrated as divided into a number of vertical columns each of which may conveniently represent a machine in the group being monitored. As the pen traverses and re-traverses the chart 5, the latter very slowly advances in the direction indicated by the arrow so that the production status of a number of machines may be recorded over a substantial period of time, for example one complete working day.

The pen 4 is moved by the belt 3 which is looped around idler rolls 6 and drive pulley 7. The drive pulley 7 is connected to ratchet 8 and gear 9 which are mounted in tandem on conventional shaft means (not shown). A pawl 10 engages the ratchet 8 in the manner illustrated and is eccentrically mounted on the shaft 11 of the motor 1 by means of pin 12. A spring clutch 13, whose function will be described later, is located between the end face of shaft 11 and the underface of the pawl 10 and about the pin 12. Gear 14 is also mounted on shaft 11 and is clutched thereto by a conventional means, not illustrated, so that the gear 14 is driven by the shaft 11 in one direction and freewheels or idles in the other. Gear 14 engages an idler gear 15 which in turn engages the teeth of gear 9 which, as previously mentioned, is connected to pen drive pulley 7. A limit pin 16 is located above the pawl 10 and is attached in stationary position to any convenient portion of the bracket 2 or similar surface. A second pin 17 is mounted on the face of gear 9 in a position to engage one end of reversing switch 18 when the pen has completed one traverse of the chart 5. Switch 18 when actuated causes reversal of the motor 1 through the conventional motor circuit 19, illustrated.

Figure 1:
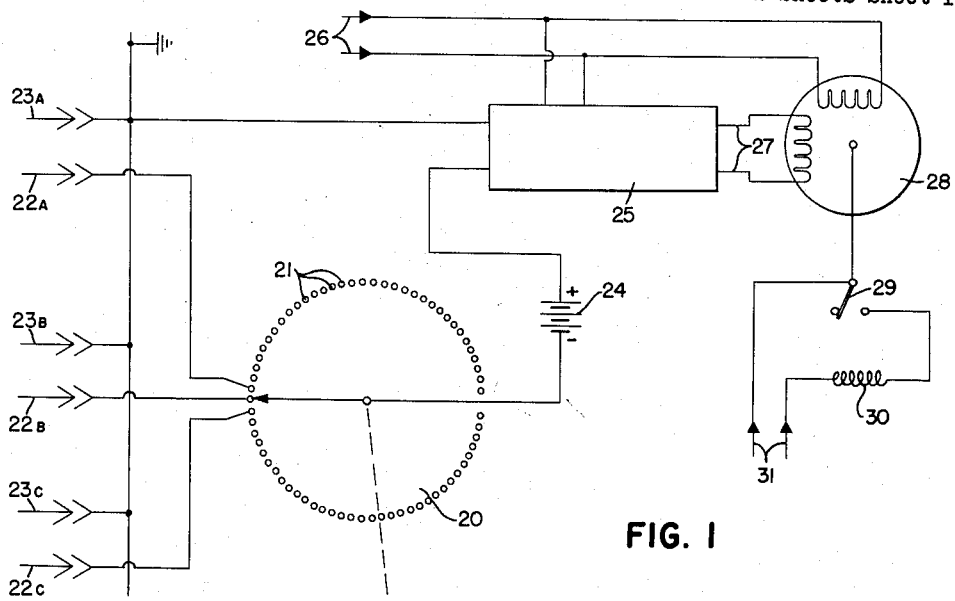
FIG. 1 is a schematic diagram of the principal electrical features of a recorder made according to the present invention.

FIG. 1 illustrates schematically the electrical system for selecting the machine to be monitored and actuating the marking pen 4 in accordance with the signals received.

The machines being monitored are sequentially selected by means of stepping switch 20 which is mechanically coupled to pen drive pulley 7. The stepping switch 20 has a plurality of terminals 21, each one of which corresponds to a machine and to one of the discrete pen positions on chart 5. The terminals 21 of the stepping switch 20 are connected to electrical leads 22a, b, c, . . . which in turn are connected to the coupling or sensing devices which will subsequently be described. A second group of electrical leads 23a, b, c, . . . are connected to the common ground. The center pole of switch 20 is connected to potential source 24 which supplies a reference voltage to the amplifier 25. The amplifier 25 receives power through the leads 26 which are connected to a conventional commercial power source (not shown). Leads 26 and amplifier output leads 27 energize the field coils of a motor switch 28. Switch 28 when actuated by a suitable signal from the amplifier 25 moves its contact 29 to momentarily close the circuit to pen operating relay coil 30 which is energized from a conventional power source through leads 31. Pen operating coil 30 is also shown in FIG. 2 to the left of the chart 5. Coil 30 actuates pen 4 and causes it to place a small dot on the chart 5 indicating "in operation" status of the machine then connected to the recorder through the electrical circuit just described.

In large scale data processing systems utilizing, for example, punched cards, certain operations are performed only infrequently or sporadically and usually for short periods of time. It is desirable in a production status recording system to record the status of each machine frequently but ordinarily not more often than once each minute. For the purposes of recording data processing equipment status, the apparatus described has been designed to accommodate a hundred machines which are recorded as operating or not approximately ever 50 seconds with a pen return time of approximately five seconds. Therefore, for practical purposes, each complete traverse of the pen and cycle of the switch 20 represents one minute of the working day. Where some of the machines being monitored are operated for less than a minute as might be the case in a card sorter, it is possible that the machine would be deenergized before the recorder receives a signal through the selector mechanism indicating that the machine is operating. Since in evaluating sorting operations it is usually sufficient to know that the sorter was energized at least once during a certain number of minutes during a working day, it is possible to establish a criterion that if a machine operates for any period during any given minute it may be recorded as having operated for that minute. Although the sensing or coupling units illustrated in FIGS. 3 and 4 perform other functions and may be used with other conventional machines, they are particularly adapted to accommodate machines which are perhaps infrequently energized or which are operated under varying load conditions. The coupling or sensing unit shown in FIG. 3 is particularly designed to be connected across the power circuit for a machine operated in the manner of a sorter. Since the sorter may operate for only a fraction of a minute at any given time, the coupling unit contains features which assure that the signal representing operation of the sorter is available to the recorder at any time during one complete traverse of the pen.

Referring specifically to FIG. 3, the leads 32 provide power to a sorting or similarly used machine. A current relay 33 is connected in series in one of the leads 32 and is actuated, when the sorter is energized, to close its normally open contacts 34. Contacts 34 are in series with relay 35, both of which are in parallel across two of the leads 32. When contacts 34 close, relay 35 is energized and its normally open contacts 36 are closed to lock in relay 35 across two of the power leads 32. At the same time, timer relay 37 is connected across the power circuit to the sorter and begins its cycle at the end of which its normally closed contacts 38 open. A transformer 39 is also connected across two of the power leads 32 with contacts 34 and 36 in series with its primary. The secondary of transformer 39 is connected from one end to resistor 40 and rectifier 41 to terminal 42. The other end of the secondary of transformer 39 is connected directly to terminal 43 and the common ground. A condenser 44 and a resistor 45 are connected in parallel across these two terminals. Terminals 42 and 43 connect to a pair of leads corresponding, for example, to leads 22a and 23a in FIG. 1. In order to retain the signal derived in transformer 39 for a sufficient time to permit the recorder to complete its cycle and assure that the signal is received, the timer 37 is chosen to have an interval of about 60 seconds or slightly in excess of the pen traverse time.

FIG. 4 illustrates a sensing unit for use with a machine which is energized for substantial periods but under varying load conditions. In the illustrative case of a large data processing installation, machines such as computers and tabulators may be energized over substantial periods but idling until called upon to actually tabulate data. In many such cases, the current being drawn by the machine under idling conditions approaches that utilized when actually performing work. The electrical sensing circuit illustrated in FIG. 4 is designed to avoid the possibility of a false signal being sent to the recorder when the machine being monitored actually is only idling. The circuit has a variable feature incorporated in it which permits its use in this type of situation and also in the situation where a machine when operated goes from a no load to full load status. Referring to FIG. 4, power leads 46 connect a conventional voltage source to the machine to be monitored. A current transformer 47 has its primary connected in series with one of the power leads 46. The secondary of transformer 47 derives a signal proportional to the current through the primary and presents this signal to the terminals 48 and 49 through the series connected variable potentiometer 50. The potentiometer 50 may be set to discriminate between various load levels of the machine being monitored by proportioning the voltage signal from transformer 47 for optimum effectiveness in opposing the reference voltage of source 24 generated at the recorder. Terminals 48 and 49 connect to two leads corresponding, for example, to leads 22b and 23b in FIG. 1. A resistor 51 and a capacitor 52 are connected in parallel with the secondary of transformer 47. A rectifier 53 is connected in the line from one side of the secondary of transformer 47 to one of the terminals of the sensing unit and to the common ground.

The following cycle of the recording process will illustrate the operation of the entire system. With the pen 4 located at the zero column on chart 5, the recorder is energized by closing a start switch (not shown). The chart 5 advances in the usual manner and at the same time pen drive motor 1 is energized to rotate, for example, in a counterclockwise direction at a rate of two revolutions per second in order to provide a traverse rate of 50 seconds for 100 machines. Gear 14 as previously mentioned is clutched onto shaft 11 so that it freewheels when the shaft rotates in such a fashion. However, the pawl 10, due to its eccentric mounting on shaft 11, progressively steps the ratchet 8 in a counterclockwise fashion. This moves the pen 4 across the chart in discrete steps determined by the ratchet teeth size and spacing. Due to the mechanical connection between the belt drive 7 and the stepping switch 20, the switch successively connects the sensing units of the plurality of machines being monitored to the recorder through the circuitry previously described. If a signal is received from the sensing unit that a particular machine is operating, the recorder circuit described causes the pen solenoid 30 to actuate the pen 4 and mark the chart accordingly. In this fashion, the pen is moved across the chart in discrete steps until all machines are monitored, at which time pin 17 has rotated with gear 9 to a position which will actuate reversing switch 18. When switch 18 is operated by pin 17, drive motor 1 reverses its direction of rotation which causes gear 14 to rotate in a clockwise direction and drives the pen rapidly back to its starting position through the gear train including gears 9 and 15. During this reverse traverse the pen solenoid 30 is prevented from operating since the contact of switch 20 moves across the terminals so rapidly that the motor relay 28 has insufficient time to actuate. Of course, if desired, a relay could easily be installed in circuit 19 to disconnect solenoid 30 upon reversal of motor 1. Upon the reversal of the direction of rotation of drive motor 1, the spring clutch 13 acting between the shaft 11 and the pawl 10 flips the pawl up away from ratchet 8 until it is stopped by pin 16. When the pen is returned to its original position, reversing switch 18 is returned to its normal connection since pin 17 completes its revolution with gear 9 and reactuates the switch. This causes motor 1 to assume the counterclockwise rotation once again which releases spring clutch 13 and drops pawl 10 back to its normal position. The recording cycle is then repeated automatically.

For certain purposes, the stepping switch 20 may be replaced by a serise of contacts 54 located adjacent to and sequentially contacted by the pen 4 as illustrated in FIG. 2. The return half of the circuit may be completed through the drive belt 3 and the brush 55 to the negative side of voltage source 24. This arrangement insures positive coordination of the pen position and the desired associated sensing unit.

Figure 5:
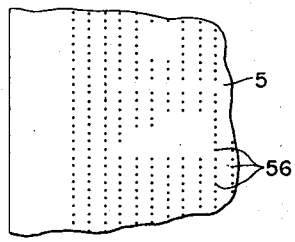
FIG. 5 illustrates a portion of a chart from a recorder made according to the present invention on which the production status of a number of machines has been recorded.

FIG. 5 illustrates a portion of a chart on which the production status of a series of machines has been recorded. It has been found that with the recording system utilized, the dots 56, indicating that a machine is in operation at the particular minute in question, may be made very small and that the chart advance return may be held to a minimum so that an entire day's operation may be recorded on a relatively short strip of chart. In an actual test of the device, the chart speed was maintained at a rate permitting thirty dots per longitudinal chart inch. An eleven inch wide chart was found to easily accommodate one hundred columns for one hundred machines. Hence, an eleven by sixteen inch chart is sufficient to record an entire eight hour shift operation involving one hundred machines. Under such conditions, it has been found that the absence of a dot which indicates that a machine is not operating during that particular interval is very easily detected. An examination of FIG. 5 will illustrate how the recorded data is easily assimilated visually. In addition, for certain purposes electrically actuated mechanical counters may be coupled into the pen solenoid circuit and the machines being monitored grouped according to type so that the resulting unit-minute count when compared to the maximum unit-minute count possible over the interval gives a rapid percentage down-time comparison for any working period.

While certain representative embodiments and details have been shown for the purpose of illustrating the invention, it will be apparent to those skilled in this art that various changes and modifications may be made therein without departing from the spirit or scope of the invention.

I claim:

1. A device for recording the productive operation time of a plurality of machines of a type which are energized for substantial periods under varying load conditions comprising in combination, a strip chart, means to advance said chart to permit recording thereon events occurring over a substantial period of time, pen means associated with said chart and arranged to move across said chart in a direction substantially perpendicular to the direction of advance thereof, actuating means responsive to signals indicating the production status of said machines and adapted to cause said pen means to mark said chart accordingly, means to drive said pen means across said chart in discrete steps, reversing means associated with said drive means and adapted to rapidly traverse said pen back to its starting position after it has moved across said chart in discrete steps, electrical sensing means to derive from each of said machines a signal representative of the production status thereof, said sensing means comprising means coupled to one input line of a machine for deriving a signal representative of the magnitude of the current in said line and variable potential dividing means coupled to said deriving means and adapted to proportion said derived signal to discriminate between selected levels of said loads; and selector means coordinated with the position of said pen means and adapted to sequentially connect said sensing means to said pen actuating means whereby the production status of said plurality of machines is recorded sequentially as the pen moves discretely across said chart.

2. A device as claimed in claim 1 in which said selector means comprises a stepping switch means.

3. A device for recording the productive operation time of a pluraltiy of machines of a type which are energized for substantial periods under varying load conditions comprising, in combination, a strip chart, means to advance said chart to permit recording thereon events occurring over a substantial period of time, pen means associated wtih said chart and arranged to move across said chart in a direction substantially perpendicular to the direction of advance thereof, solenoid means responsive to signals indicating the production status of said machines and adapted to cause said pen means to mark said chart accordingly, ratchet and pawl means to drive said pen means across said chart in discrete steps, reversing means associated wtih said ratchet and pawl means and adapted to rapidly traverse said pen back to its starting position independently of said ratchet and pawl means after it has moved across said chart in discrete steps, electrical sensing means to derive from each of said plurality of machines a signal representative of the production status thereof, said sensing means comprising transformer means coupled to one input line of a machine for deriving a signal representative of the magnitude of the current in said line, and variable potentiometer means coupled to said transformer means and adapted to proportion said derived signal to discriminate between levels of said loads; and stepping switch means coordinated with the position of said pen means and adapted to sequentially connect said sensing means to said pen solenoid means whereby the production status of said plurality of machines is recorded sequentially as the pen moves discretely across the chart.

References Cited in the file of this patent

UNITED STATES PATENTS

| | | |
|---|---|---|
| 359,338 | Wheeler | Mar. 15, 1887 |
| 807,774 | Rasehorn | Dec. 19, 1905 |
| 1,343,196 | Conway | June 15, 1920 |
| 2,237,373 | Sinclair | Apr. 8, 1941 |
| 2,340,279 | Wallace | Jan. 25, 1944 |
| 2,561,372 | Hillman | July 21, 1951 |
| 2,613,260 | Stevens | Oct. 7, 1952 |
| 2,886,759 | Umrath | May 12, 1959 |
| 2,892,156 | Dawson | June 23, 1959 |
| 2,926,984 | Gerbrands | Mar. 1, 1960 |

FOREIGN PATENTS

| | | |
|---|---|---|
| 398,214 | Great Britain | Sept. 1, 1933 |